April 15, 1969    W. REIL ET AL    3,438,176
APPARATUS FOR MANIPULATING PARALLELEPIPED CONTAINERS
Filed March 23, 1964    Sheet 2 of 4

INVENTORS

United States Patent Office 3,438,176
Patented Apr. 15, 1969

3,438,176
APPARATUS FOR MANIPULATING PARALLELEPIPED CONTAINERS
Wilhelm Reil, Elmshausen uber Bensheim, Bergstrasse, and Werner Schwarzwälder, Wuppertal-Elberfeld, Germany, assignors to Habra-Werk Wilh. F. Ott, Darmstadt, Germany
Filed Mar. 23, 1964, Ser. No. 353,672
Claims priority, application Germany, June 26, 1963, H 49,553
Int. Cl. B65b 7/20
U.S. Cl. 53—379                    15 Claims The present invention relates to an apparatus for manipulating parallelepiped containers, and more particularly to an apparatus for finishing the treatment of filled and presealed containers which are provided with strip-shaped flaps and with triangular gussets consisting of heat-sealable web material. Still more particularly, the invention relates to an apparatus for further treatment of containers which may be produced in a machine of the type disclosed, for example, in a copending application Ser. No. 353,673 of Reil and Schwarzwälder, now Patent No. 3,335,540 granted Aug. 15, 1967, to which reference may be had if necessary.

In the machine of the aforesaid copending application, consecutively formed, filled and presealed containers are discharged with strip-shaped transverse flaps extending across the top and bottom end walls thereof and with a triangular gusset at each end of each flap. In order to facilitate packing of such containers in boxes, crates or similar receptacles, it is necessary to fold, bond and sometimes clip the flaps and gussets so that a large number of finished containers may be stored in a small receptacle.

It is an important object of this invention to provide a novel apparatus for folding, sealing or bonding and, if necessary, clipping flaps and gussets of filled and presealed parallelepiped containers in a fully automatic way and at the same rate at which such containers issue from an automatic or semiautomatic forming, filling and presealing machine.

Another object of the invention is to provide an apparatus of the just outlined characteristics wherein some of the gussets may be transformed into suitable handles which will facilitate manipulation of such containers by the distributor and by the ultimate user.

A further object of the invention is to provide an apparatus for manipulating presealed parallelepiped containers which are filled with a flowable (liquid, viscous or comminuted solid) material and wherein each container is treated in a series of rapidly following steps and in such a way that its contents are not affected by heat which develops when the flaps and gussets are sealed in themselves and to the walls of the container.

Still another object of the invention is to provide an apparatus of the above outlined characteristics wherein consecutively finished containers are automatically stacked in receptacles and wherein such treatment and stacking of containers can take place in a small area and with the help of comparatively simple instrumentalities.

A concomitant object of the invention is to provide improved folding, heat-sealing and clipping devices which may be utilized in an apparatus of the above outlined characteristics.

A further object of the invention is to provide an improved stacking device which may be utilized in our apparatus and wherein a requisite number of containers may be stacked in boxes, crates or similar receptacles without necessitating any assistance or supervision on the part of operators.

An additional object of the invention is to provide an apparatus for folding, heat-sealing and clipping flaps and gussets of parallelepiped containers which is constructed and assembled in such a way that it may receive parallelepiped containers directly from a container forming, filling and presealing machine and which is capable of manipulating the containers at the same rate at which the containers issue from the machine.

A further object of the invention is to provide an apparatus wherein the containers may be manipulated without undergoing any deformation and wherein a partially deformed container is automatically reshaped or remolded so that, on leaving the apparatus, it resembles a perfect parallelepiped.

Another object of the invention is to provide an improved conveyor for use in an apparatus of the above outlined characteristics and to construct the conveyor in such a way that at least certain walls of consecutive containers remain protected against deformation or are automatically reshaped (if necessary) while their flaps and gussets undergo a series of folding, heat-sealing and other treatments.

Still another object of the invention is to provide an improved parallelepiped container which is formed with specially configurated handles so that it may be handled with ease and that one of its ends may be opened in a very simple and time-saving manner.

Another object of the invention is to provide an apparatus for manipulating parallelepiped containers which may be rapidly and conveniently converted for manipulation of differently dimensioned and/or configurated containers.

With the above object in view, one feature of the present invention resides in the provision of an apparatus for manipulating filled heat-sealable containers of the type having an end wall, two triangular gussets extending laterally beyond the opposite ends of the end wall, and a flap extending transversely across and outwardly beyond the end wall and the gussets. The apparatus comprises a conveyor including a rotary drum having a plurality of equidistant recesses or pockets each extending radially inwardly from the periphery and preferably all the way from the one to the other axial end of the drum and each serving to accommodate a container in such a way that the flap extends beyond the periphery and that the gussets extend beyond the axial ends of the drum, drive means for intermittently rotating the drum through distances which equal the angular distance between the recesses, first folding means adjacent to the periphery of the drum and arranged to fold the flaps of consecutive containers against the respective end walls and gussets during intermittent rotations of the drum, second folding means adjacent to the drum and arranged to fold the gussets of consecutive containers against the thus folded flaps and against the end walls of consecutive containers during intermittent rotations of the drum, and heat-sealing means for bonding the thus folded gussets of consecutive containers to the respective flaps and end walls between intermittent rotations of the drum.

The conveyor may comprise a single drum having for example six equidistant recesses, or a pair of cooperating drums each of which may be provided with for example four recesses. One of the drums may convey containers consecutively along a first group of folding, heat-sealing, clipping and other instrumentalities, and the other drum thereupon receives consecutive containers from the one drum and advances them past additional instrumentalities so that each container may be subjected to a large number of treatments and is thereupon discharged into a stacking device.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

The apparatus of our invention is used for folding, bonding or sealing and, if necessary, clipping the flaps and gussets on filled heat-sealable parallelepiped containers and for thereupon stacking and packing such containers in boxes, crates or similar receptacles. Prior to proceeding with a detailed description of the apparatus, reference will be had to FIGS. 9 and 10 which respectively illustrate a filled and presealed parallelepiped container 1 as it issues from a machine of the type disclosed in the copending application Ser. No. 353,673 of Reil and Schwarzwälder, and a finished parallelepiped container 1' which is obtained after a container 1 undergoes various treatments in the apparatus of FIG. 1 or 3. The container 1 comprises two wide rectangular side walls 1a, two narrow rectangular side walls 1b, a rectangular bottom end wall 3, a rectangular top end wall 6, a strip-shaped transverse flap 4 which is integral with the bottom end wall 3, two laterally extending triangular gussets 5 which are integral with the flap 4 and with the opposite ends of the bottom end wall 3, a second strip-shaped transverse flap 7 which is integral with the top end wall 6, and two triangular gussets 8 which are integral with the flap 7 and with the opposite ends of the top end wall 6. It will be noted that the gussets 5 and 8 respectively extend beyond the narrower ends of the end walls 3 and 6, and that the flaps 4 and 7 respectively extend outwardly from and beyond the parts 3, 5 and 6, 8. In other words, and taking the flap 7, this flap extends from the free tip of the left-hand gusset 8 to the free tip of the right-hand gusset 8. The flaps 4, 7 and the gussets 5, 8 consist of twin layers of web material which forms the container 1, and the two layers of each of the flaps 4, 7 are heat-sealed to each other so as to confine a measured quantity of flowable (liquid, viscous or comminuted solid) material which fills or nearly fills the container 1. This container is obtained from a tube of heat-sealable web material (such as paper tape coated with a layer of synthetic thermoplastic material, a film consisting exclusively of thermoplastic material, a metallic foil one side of which may be coated with synthetic thermoplastic material, or a laminated structure comprising layers of paper, metallic foil and synthetic thermoplastic material), and the container is formed by heat-sealing the overlapping marginal portions 2, by thereupon heat-sealing the tube at its leading end to form the flap 4, and by finally heat-sealing the trailing end of the tube to form the flap 7. The material is admitted subsequent to formation of the flap 4, preferably through a hollow filling mandrel which is provided with a shaping portion of rectangular outline. As a rule, the web which is to form the container 1 is grooved to form longitudinal fold lines which are disposed at the four corners of the container and to form transverse fold lines which determine the outlines of the end walls 3, 6, flaps 4, 7 and gussets 5, 8.

Figure 10:
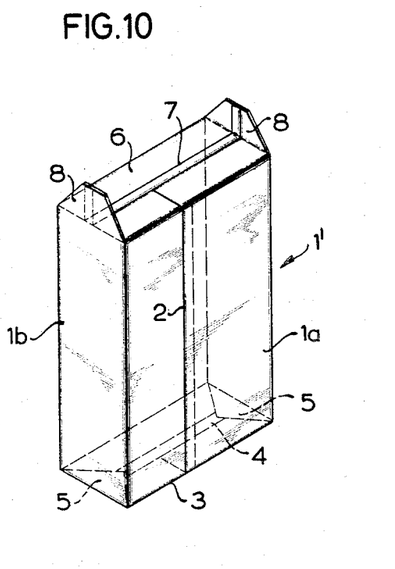
FIG. 10 is a perspective view of a finished container as it appears after issuing from the apparatus of FIGS. 1–2 or 3–8.

FIG. 10 shows that, in order to obtain a finished container 1', the container 1 must undergo a series of treatments including folding the lower flap 4 flat against the exposed side of the bottom end wall 3 and against the undersides of the gussets 5, heat-sealing the gussets 5 in themselves so that their layers form a single sheet or panel of heat-sealed material, folding the gussets 5 against the underside of the bottom end wall 3, heat-sealing the gussets 5 to the flap 4 and bottom end wall 3, clipping the gussets 8 by severing their tips 8a, folding and (if necessary) heat-sealing the upper flap 7 against the exposed side of the top end wall 6 and against the upper sides of the remaining trapeziform portions of the gussets 8, and bending the trapeziform portions of the gussets 8 into the planes of the respective side walls 1b so that the gussets 8 constitute two handles which may be grasped by a salesman or by the ultimate user in order to facilitate withdrawal of the container 1' from a box or crate and to facilitate handling of the container during removal from a shelf, during placing into a shopping cart, during placing into a refrigerator, or during opening. It will be noted that the container 1' is free of any projecting parts, save for the trapeziform portions of the flaps 8 and, if desired, the flaps 8 may also be folded and heat-sealed against the top end wall 6 to insure that the ultimate product is a body of truly parallelepiped outline.

We wish to mention here that the containers which are treated and manipulated in the apparatus of our present invention may but need not be formed with rectangular side and end walls because the apparatus is equally useful for treatment and processing of parallelepiped containers with square side and end walls.

Figure 1:
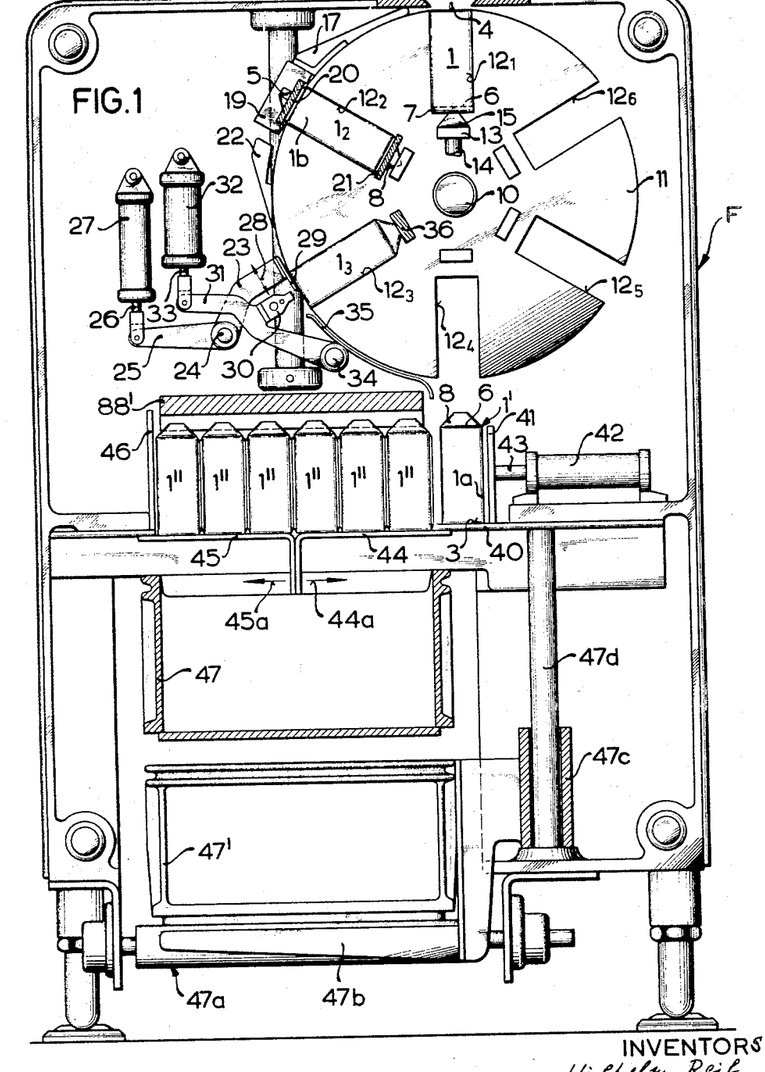
FIG. 1 is a vertical section through a combined sealing, folding, clipping and stacking apparatus which embodies one form of the invention.

Referring to FIG. 1, the aparatus therein shown embodies one form of our invention and comprisees a conveyor including a single rotary drum 11 having six equidistant recesses of pockets $12_1$–$12_6$ each of which extends inwardly from the periphery and all the way from the one to the other axial end thereof. Each of these pockets is dimensioned in such way that it may accommodate the main part of a container 1 with the flap 4 extending beyond the periphery of the drum 11 and with the gussets 5, 8 extending beyond the respective end faces, i.e., beyond the respective axial ends of the drum. This drum is arranged to rotate intermittently about the axis of a horizontal drive shaft 10 which forms part of an indexing mechanism further including a suitable transmission, for example, a Geneva transmission of any conventional design. The drum is rotated in such a way that it turns through angles of 60 degrees and in a counterclockwise direction, as viewed in FIG. 1. Whenever the drum 11 is idle, one of the pockets $12_1$–$12_6$ extends vertically upwardly and another pocket extends vertically downwardly. In FIG. 1, the pocket $12_1$ opens upwardly and accommodates a freshly filled and presealed container 1. The pocket $12_4$ has discharged a finished container 1', the pockets $12_5$ and $12_6$ are empty, and the pockets $12_2$, $12_3$ accommodate containers $1_2$, $1_3$ whereby such containers undergo a series of treatments which are necessary to obtain finished containers 1'. Each freshly formed container 1' is discharged by gravity as soon as the respective pocket reaches the station occupied in FIG. 1 by the pocket $12_4$.

The pocket $12_1$ is located just beneath the open-and-shut mold of a machine of the type disclosed in our aforementioned copending aplication so that the container 1 shown in this pocket is the last container to have been made, filled and presealed in such machine. The operation of the machine is synchronized with the operation of the transmission which drives the shaft 10 so that the drum 11 turns through an angle of 60 degrees after the mold opens to discharge a presealed container which automatically descends into one of the pockets $12_1$–$12_6$. In other words, the aparatus of FIG. 1 processes the containers at the same rate at which such containers issue from the machine that transforms a continuous web of heat-sealable material into containers. It will be noted that the pocket $12_1$ receives the container 1 in such a way that the top end wall 6 is at the leading (lower) end of the container and that the flap 4 extends upwardly and beyond the periphery of the drum 11, i.e., beyond the open outer end of the pocket $12_1$. The reason for such insertion is that the container 1 is inverted while travelling with the drum through an angle of 180 degrees so that the flap 7 will be located at the upper end of the finished container 1′. As a rule, the weight of the material filling a container 1 is sufficient to insure that the container descends all the way to the inner end of the pocket; however, and if desired, the drum 11 may be equipped with suitable pushers or stampers which compel the containers to penetrate all the way to the inner ends of the respective pockets. For example, such pushers may take the form of fluid-operated cylinders with motion transmitting plates secured to their piston rods and adapted to engage the end walls 3 and to shove the containers into the aligned pockets. The pushers are not shown in FIG. 1 because they constitute an optional feature of our apparatus.

Figure 9:
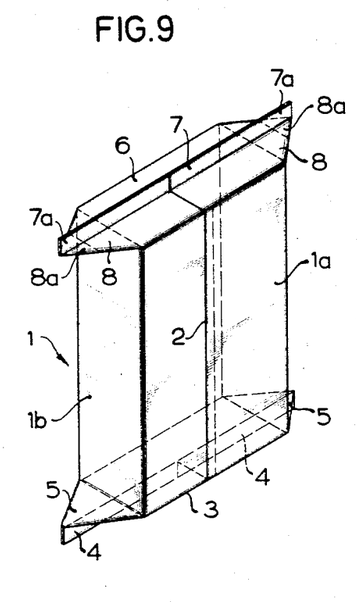
FIG. 9 is a perspective view of a presealed container.

The drum 11 cooperates with a first folding device including two folding members 13 which are adjacent to the end faces thereof and each of which comprises an inclined cam face 15 which engages the respective end of the flap 7 and begins to fold this flap against the end wall 6. In other words, each cam face 15 will engage that portion of a flap 7 which is integral with and extends outwardly beyond one of the gussets 8. Such portions of the flap 7 are indicated in FIG. 9 by reference numerals 7a. The folding members 13 are mounted on spring-biased bars 14 which are reciprocable in the radial direction of the drum 11. When the drum is thereupon rotated through 60 degrees, the tips of the folding members 13 fold the flap 7 all the way against the end wall 6 and, in a simultaneous operation, an arcuate plate-like fixed folding member 17 folds the other flap 4 flat against the end wall 3. This folding member 17 is adjacent to the periphery of the drum 11 and is located at a point past the receiving station occupied in FIG. 1 by the container 1 in the pocket $12_1$. The member 17 is further provided or associated with folding cams which bend the gussets 5 into the general planes of the respective side walls 1b so that these gussets extend radially outwardly and beyond the periphery of the drum 11. The container $1_2$ which is received in the pocket $12_2$ is provided with folded flaps 4, 7 and with gussets 5 bent into the planes of its side walls 1b. At this second station of the aparatus, the gussets 5 are disposed at the opposite sides of a heat-sealing block or anvil 19 which forms part of a heat-sealing device and is adjacent to the outer side of the folded-over flap 4. The anvil 19 serves as a stop for two heat-sealing jaws 20 (only one shown) which move substantially axially of the drum 11 toward and away from the exposed sides of the gussets 5 on that container which is accommodated in the pocket $12_2$ or in any other pocket which occupies the same station as the pocket $12_2$. The anvil 19 and/or the paws 20 may be heated to requisite temperature by suitable heating elements which may be connected to a source of electric current, not shown. The jaws 20 may be reciprocated by fluid-operated cylinders, not shown, in synchronism with indexing movements of the drum 11 so that the jaws move toward the anvil 19 between intermittent advances of the drum and move away from the anvil just before the drum advances through an angle of 60 degrees in order to move the next container in registry with the heat-sealing device, i.e., with the anvil 19 and jaws 20. It will be noted that the area of the heat-sealing face on a jaw 20 need not be the same as the area of one side of a gusset 5; it suffices if these gussets are sealed in immediate proximity to the end wall 3.

The gussets 8 are disposed at the opposite axial ends of the drum 11 and are heat-sealed by jaws 21 which may also fold them against the respective end faces of the drum. In other words, the jaws 21 (only one shown in FIG. 1) may fold the gussets 8 through about 90 degrees so that one side of each gusset 8 abuts against the respective end face of the drum, and the layers of each of these gussets are then bonded to each other when the jaws 21 continue to press the gussets against the end faces of the drum.

Figure 2:
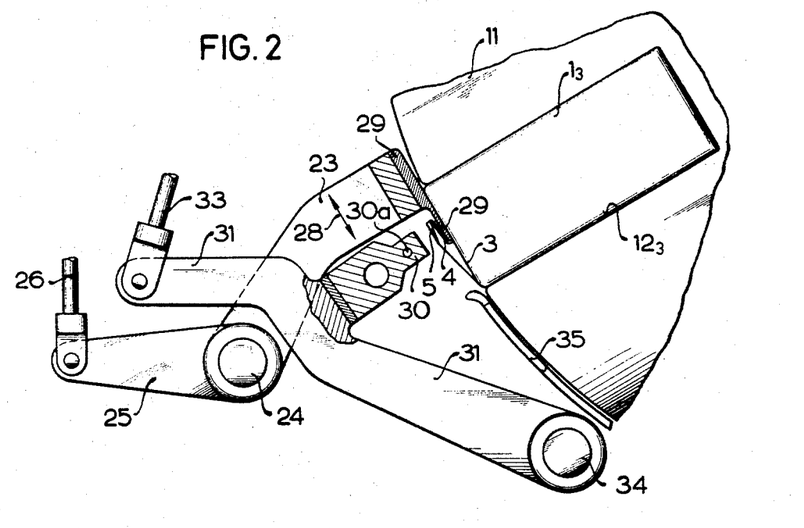
FIG. 2 is an enlarged view of a detail of the structure shown in FIG. 1.

As the drum 11 again advances through an angle of 60 degrees, the gussets 5 travel along and are folded by folding members 22 which cause these gussets to lie flat against the outer side of the end wall 3. Such folding is completed when a container 1 reaches the station occupied in FIG. 1 by the container $1_3$ in pocket $12_3$. At this third treating station, the gussets 5 will be bonded to the flap 4 by a heat-sealing device which is illustrated in FIG. 2 and which comprises a bell crank lever 23 arranged to pivot about a horizontal pivot pin 24 which is fixed to the frame F. One arm of the bell crank lever 23 carries a backing member here shown as a tongue 29 which will be inserted between the end wall 3 and the folded-over flap 4 so that a heat-sealing jaw 30 may seal the gussets 5 to this flap. The second arm 25 of the bell crank lever 23 is articulately connected with a piston rod 26 which is reciprocable in a hydraulic or pneumatic cylinder 27. The upper end of this cylinder is pivotable about a horizontal pin which is secured to the frame F. The jaw 30 is carried by the median portion of a single-armed lever 31 one end of which is rockable about the horizontal axis of a fixed pivot pin 34 and the other end of which is articulately coupled to a piston rod 33 which reciprocates in a hydraulic or pneumatic cylinder 32. This cylinder is also rockable about a horizontal pin which is carried by the frame F. The tip of the jaw 30 is heated by an electric heating element 30a. A double-headed arrow 28 indicates the directions in which the tongue 29 may move in response to reciprocation of the piston rod 26.

When the container $1_3$ reaches, and comes to a halt in, the position shown in FIG. 1 or 2, the edge of the tongue 29 extends into the slit between the folded-over flap 4 and the exposed side of the end face 3. The gussets 5 are folded over the flap 4 because they have passed along the folding members 22. The cylinder 32 then causes the lever 31 to turn in a clockwise direction and to press the heat-sealing jaw 30 against the exposed sides of the gussets 5 so that the inner layers of these gussets are bonded to the flap 4. It should be mentioned here that in some instances, the first heat-sealing device 19, 20 may be dispensed with because the layers of each of the gussets 5 may be heat-sealed to each other and may be heat-sealed to the flap 4 in a single operation which is carried out by the tongue 29 and heat-sealing jaw 30. The tongue 29 prevents the jaw 30 from exerting excessive pressure on the end wall 3 and also serves as an anvil to cooperate with the jaw 30 in producing the heat-sealing action.

The drum 11 cooperates with a further folding member 35 which is adjacent to the path of the thus folded and heat-sealed gussets 5 and which exerts against such gussets a certain pressure sufficient to make sure that the thermoplastic material sets and that the gussets remain bonded to the flap 4.

FIG. 1 illustrates one of two reciprocable knives 36 which are adjacent to the inner end of the pocket $12_3$ and which serve to remove the triangular tips $8a$ of the respective gussets 8. Both gussets 8 are clipped in a simultaneous step. The thus removed tips $8a$ may be allowed to drop into suitable chutes or are collected by suction conveyors, not shown.

If desired, portions of, or the entire, flap 4 may be heat-sealed to the bottom end wall 3. However, this is not absolutely necessary because once it is bonded to the gussets 5 in a manner as shown in FIG. 2, the flap 4 will remain flat against the bottom end wall 3. The other flap 7 will remain flush against the end wall 6 as soon as the adjacent portions of the gussets 8 are sealed by the jaws 21.

After the container 12 advances through an angle of 60 degrees, it reaches the station occupied in FIG. 1 by the pocket $12_4$ and descends by gravity to come to rest in the stacking device and to occupy a position taken in FIG. 1 by the container 1'. It will be noted that the bottom end wall 3 of this container 1' rests on a horizontal supporting plate 40 and that the trapeziform portions of the gussets 8 on this container 1' extend upwardly and are located in the general planes of the respective side walls $1b$. The container 1' has left the pocket $12_4$ by gravity even though a suitable pusher may be provided to assist such descent of containers into the stacking device. The surfaces surrounding the pockets $12_1$–$12_6$ will remold or reshape a deformed container 1 so that each container may resemble a true parallelepiped as soon as it enters the respective pocket.

The stacking device of FIG. 1 comprises the aforementioned supporting plate 40 which supports the bottom end wall 3 of the container 1' and which simultaneously presses the freshly sealed flap 4 and gussets 5 against the exposed side of the end wall 3. The right-hand side wall $1a$ of the container 1' is then engaged by a usher plate 41 which is reciprocable by the piston rod 43 of a horizontal cylinder 42 and which transfers the container 1' onto a two-piece table consisting of two horizontal panels 44, 45. In FIG. 1, the panels 44, 45 support a row including six finished containers 1" which are about to descend into an empty crate 47 located therebelow. The panels 44, 45 are movable horizontally in and counter to the directions indicated by arrows $44a$, $45a$. The leftmost container 1" abuts against a fixed stop plate 46. As soon as the crate 47 is filled, it descends to take a position at the level of a second crate 47' and is then withdrawn by a conveyor $47a$ to move to storage or to another destination. The conveyor $47a$ is driven intermittently so that it moves an empty crate in registry with the table 44, 45 immediately after it receives a filled crate. The means for lifting and lowering the crates comprises a fork $47b$ which is secured to a sleeve $47c$ slidable along an upright $47d$. The means for reciprocating the sleeve $47c$ along this upright comprises a suitable fluid-operated cylinder, not shown.

The device shown in the lower part of FIG. 1 constitutes but one form of means for receiving and stacking the containers 1', 1" in crates 47, 47' or in similar receptacles.

Referring to FIGS. 3 to 8, there is shown a second apparatus which comprises a rotary drum-shaped conveyor 111 with six radially inwardly extending pockets $112_1$–$112_6$ each of which may receive a container 1. The drum 111 is driven intermittently by a horizontal drive shaft 110 in the same way as described in connection with FIG. 1, i.e., through 60 degrees at a time so that the pockets advance consecutively past a receiving station at which they receive filled and presealed containers from a machine of the type disclosed in our copending application, and thereupon past two additional stations prior to reaching the discharging or evacuating station at which (see the position of the container 1' in FIG. 3) a finished container descends into a stacking device, not shown.

Figure 7:
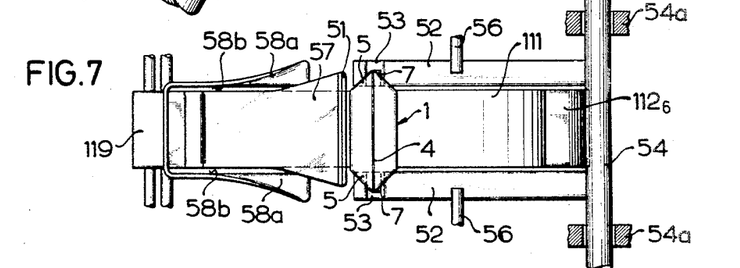
FIG. 7 is a top plan view of certain parts of the structure shown in FIG. 3.

The drum 111 cooperates with a chute including a pair of upwardly extending guide plates 50, 51 which serve to direct freshly filled and presealed containers 1 into the pockets $112_1$–$112_6$. A freshly presealed container descends in the same way as described in connection with FIG. 1, i.e., with the flap 7 leading and with the flap 4 extending upwardly and beyond the open end of the respective pocket. When a freshly presealed container 1 descends, e.g., into the vertical pocket $112_1$ of FIG. 3, the flap 7 at its lower end is partially deflected by the cam faces 53 of two elongated folding members or arms 52 which are adjacent to the end faces of the drum 111 and which are rockable with a horizontal spindle 54. The arms 52 normally abut against a pair of fixed horizontal stops 56 because they are permanently biased by helical springs 55 or by similar resilient elements, but the bias of these springs is comparatively weak so that the cam faces 53 will yield to the weight of a freshly presealed container and, during such yielding, will cause slight deflection of the lower flap 7 in a counterclockwise direction, as viewed in FIG. 3. The arms 52, their cam faces 53, the stops 56 and the bearings $54a$ for the spindle 54 are best shown in FIG. 7. The cam faces 53 are inclined with reference to planes passing radially of and through the axis of the drum 111, i.e., they will automatically deflect a flap 7 which is located in a radial plane of the drum.

The guide plate 51 is rigid with an inclined plate-like folding member 57 whose underside slopes gradually toward the periphery of the drum 111 so that, when the drum is turned through 60 degrees, the container 1 in the pocket $112_1$ will travel along and its upper flap 4 will be folded by the member 57 whereby this flap now abuts against the exposed side of the end wall 3. At the same time, the laterally outwardly extending gussets 5 will travel along suitably configurated cam-shaped folding members 58 which cause these gussets to move into the planes of the respective side walls $1b$ and to abut against the opposite sides of an anvil 119 best shown in FIGS. 4 and 8. This anvil cooperates with two aligned heat-sealing jaws 61 which are reciprocable toward and away from each other in the axial direction of the drum 111 and which cause the layers of the gussets 5 to be bonded to each other. During such heat-sealing, the side faces of the anvil 119 serve as stops and prevent inward movements of the gussets 5. The exact configuration of the folding members 58 is best shown in FIG. 7. It will be noted that these folding members are disposed at the opposite sides of the drum 111 and that each comprises a first cam face $58a$ which folds the respective gusset 5 into the plane of its side faces $5b$, and a second cam face $58b$ which thereupon retains the gusset in such plane so that the gusset is guided against one side face of the anvil 119. This anvil may be heated by one or more electric heating elements $119a$, and similar heating elements $61a$ may be provided in each of the heat-sealing jaws 61.

Figures 3, 4, 5:
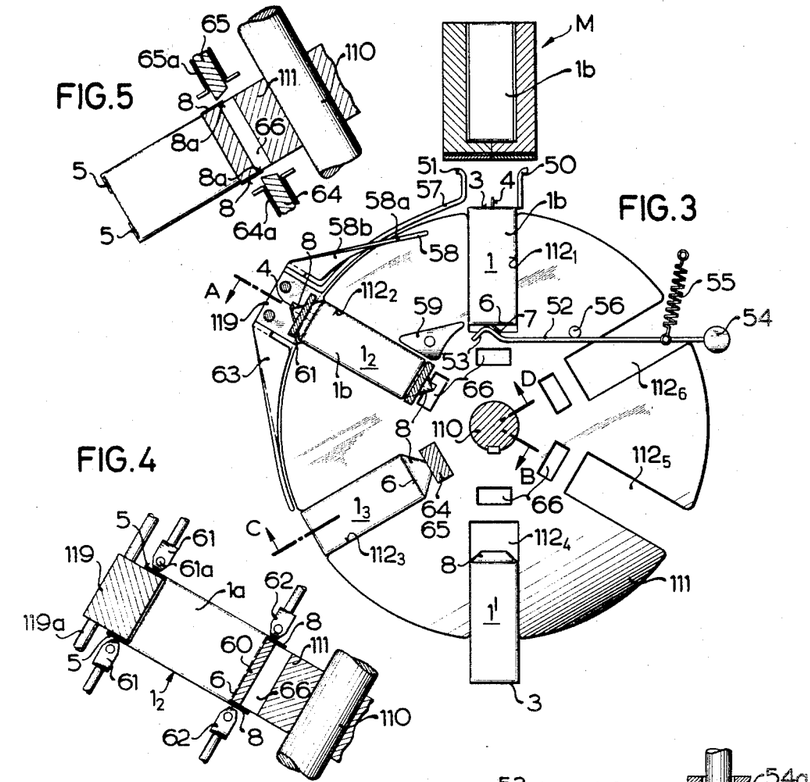
FIG. 3 is a fragmentary vertical section through a second apparatus with the stacking device omitted.
FIG. 4 is a transverse section as seen in the direction of arrows from the line A—B of FIG. 3 and illustrates the heat-sealing devices for the gussets of pre-sealed containers.
FIG. 5 is a section as seen in the direction of arrows from the line C—D of FIG. 3 and illustrates the devices which clip the tips of gussets to form trapeziform handles at one end of each finished container.

As a container advances toward the station occupied in FIG. 3 by the container $1_2$, the gussets 8 travel along a pair of folding members 59 having cam faces (see also FIG. 6) which cause the gussets to move gradually against the respective end faces of the drum 111 between consecutive stoppages of this drum so that the thus deflected gussets register with a pair of aligned heat-sealing jaws 62 best shown in FIG. 4. These jaws thereupon move toward each other to press the gussets 8 against the ends of a partition 60 of the drum 111, and this partition is located at the inner end of the respective pocket so that its outer side serves as a support for the end wall 6 and for the folded-over flap 7. Thus, the jaws 62 bond the layers of the respective gussets 8 to each other, and these jaws are heated in the same way as the jaws 61 and/or anvil 119.

It is to be noted here that, while moving along the underside of the folding member 57, a presealed container 1 which has descended between the guide plates 50, 51 will be pressed all the way to the bottom of the respective pocket so that its flap 7 is folded into actual abutment with the end wall 6 and rests on the outer side of the respective partition 60.

Figures 6, 8:
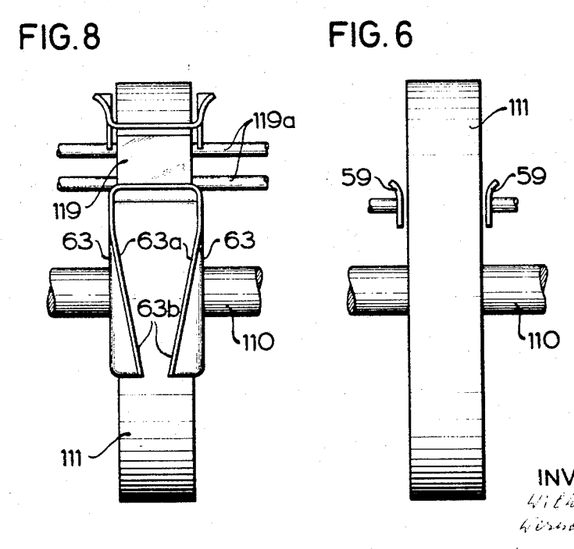
FIG. 6 is a diagrammatic end elevational view as seen from the right-hand side of FIG. 3 and illustrates a device which folds pairs of gussets into the planes of side walls of the respective containers.
FIG. 8 is an end elevational view as seen from the left-hand side of FIG. 3.

The jaws 61, 62 move away from each other before the drum 111 again rotates through 60 degrees whereby the gussets 5 travel between two folding members 63, best shown in FIG. 8, each of which comprises a first cam face 63a serving to fold the gussets 5 against the exposed side of the end wall 3 and a second cam face 63b which thereupon retains the gussets 5 in such folded-over positions. The manner in which the gussets 5 are thereupon sealed to the respective flaps 4 is the same as described in connection with FIG. 2 and, therefore, the levers 23, 31 are not shown in FIGS. 3 to 8.

When a container 1 reaches the station occupied in FIG. 3 by the container $1_3$, its gussets 8 move into the range of a clipping device including a pair of registering knives 64, 65 (see particularly FIG. 5) which are reciprocable into and out of axially extending passages 66 in the drum 111 and which serve to sever the tips 8a off the gussets 8 in the same way as described in connection with the knives 36 shown in FIG. 1. It will be noted that the members 59 fold the gussets 8 in a direction toward the axis of the drum 111, and that the triangular tip 8a of each gusset 8 then overlaps one end of the respective passage 66. The knives 64, 65 are reciprocable in guideways 64a, 65b and are attached to suitable piston rods or the like to reciprocate in synchronism with angular movements of the drum 111, i.e., during intervals between intermittent rotations of the drum.

At the station occupied in FIG. 3 by the pocket $112_4$, a finished container 1' descends by gravity into a stacking device, not shown, which may be constructed in the same way as the one shown in FIG. 1. When the container 1' descends, its gussets 8 (and more particularly the remaining trapeziform portions of these gussets) extend upwardly so that they are within reach when the crate in which such containers are stacked is opened to afford access to its contents. The flap 4 and the gussets 5 abut against the bottom end wall 3 of the container 1'.

It goes without saying that the drum 11 or 111 may be replaced by one wherein the number of pockets exceeds or is less than six. For example, a drum may be provided with eight pockets so that each container will be arrested three times before it reaches the station at which it may descend by gravity to enter the stacking device. The number of pockets will depend on the distribution of various treating devices which are positioned along the path of the containers 1 on their way to the stacking device. If desired, the knives 64, 65 may be mounted at the level of the container $1_2$ in FIG. 3 and the gussets 5 may be bonded to the flap 4 by a heat-sealing roller or the like which acts thereon while the drum is in motion. In such apparatus, the number of pockets in a drum may be reduced to four.

The open-and-shut mold M of the machine which fills and preseals the containers 1 is shown in FIG. 3 at a level just above the guide plates 50, 51.

If desired, the stacking device of FIG. 1 may comprise suitable grippers which will transfer containers into crates or similar receptacles. The carriage for such grippers is identified in FIG. 1 by a reference character 88'.

Without further analysis, the foregoing will so fully reveal the gist of the present invention that others can, by applying current knowledge, readily adapt it for various applications without omitting features which fairly constitute essential characteristics of the generic and specific aspects of this invention.

What is claimed as new and desired to be secured by Letters Patent is:

1. In an apparatus for manipulating filled heat-sealable parallelepiped containers of the type having a rectangular end wall, a pair of triangular gussets extending laterally beyond the opposite ends of said end wall, and a flap extending transversely across and outwardly beyond said end wall and said gussets, in combination, a conveyor including a rotary drum having a pair of end faces and a plurality of equidistant recesses each extending radially inwardly from the periphery and all the way from the one to the other end face of said drum, each recess being arranged to accommodate a container in such a way that the major portion of the flap is received in the respective recess and that the ends of the flap and the gussets extend beyond the end faces of said drum; drive means for intermittently rotating said drum through distances which equal the angular distance between said recesses; first folding means comprising a pair of folding members each adjacent to one end face of said drum and each arranged to engage the respective ends of flaps on consecutive containers and to fold such flaps against the end walls of the respective containers during intermittent rotations of said drum; and second folding means located past said first folding means and comprising a pair of folding members arranged to fold the respective gussets of consecutive containers against the end faces of said drum during intermittent rotations of the drum so that such gussets are substantially perpendicular to the planes of the respective end walls and extend radially inwardly toward the axis of said drum.

2. A combination as set forth in claim 1, wherein each folding member of said first folding means is a spring-biased member having a cam face which is inclined with reference to a plane passing radially of and through the axis of said drum.

3. A combination as set forth in claim 1, wherein the folding members of said second folding means are provided with cam faces which are configurated and positioned to gradually fold the respective gussets against the end faces of said drum and to complete such folding between two consecutive stoppages of said drum.

4. A combination as set forth in claim 1, wherein each gusset comprises several layers of heat-sealable material and further comprising heat-sealing means for bonding such layers to each other, said heat-sealing means comprising a pair of heated sealing members arranged to reciprocate toward and away from said end faces during intervals between intermittent rotations of said drum.

5. In an apparatus for manipulating filled heat-sealable parallelepiped containers of the type having a rectangular end wall, a pair of triangular gussets extending laterally beyond the opposite ends of said end wall, and a flap extending transversely across and outwardly beyond said end wall and said gussets, in combination, a conveyor including a rotary drum having a pair of end faces and a plurality of equidistant recesses each extending radially inwardly from the periphery and all the way from the one to the other end face of said drum, each recess being arranged to accommodate a container in such a way that the major portion of the flap is received in the respective recess and that the ends of the flap and the gussets extend beyond the end faces of said drum; drive means for intermittently rotating said drum through distances which equal the angular distance between said recesses; first folding means comprising a pair of folding members each adjacent to one end face of said drum and each arranged to engage the respective ends of flaps on consecutive containers and to fold such flaps against the end walls of the respective containers during intermittent rotations of said drum; second folding means located past said first folding means and comprising a pair of folding members arranged to fold the respective gussets of consecutive containers against the end faces of said drum during intermittent rotations of the drum so that such gussets are substantially perpendicular to the planes of the respective end walls and extend radially inwardly toward the axis of said drum; and clipping means arranged to sever portions of gussets on consecutive containers between intermittent rotations of said drum.

6. A combination as set forth in claim 5, wherein said drum is further provided with axially parallel passages each of which is adjacent to the inner end of one of said recesses and with partitions which separate said passages from the respective recesses, said passages being provided in such close proximity of the respective recesses that their ends are overlapped by portions of said gussets and that the remainder of each gusset abuts against one end of the respective partition, said clipping means comprising a pair of aligned knives arranged to extend into the ends of consecutive passages between intermittent rotations of the drum so as to sever the overlapping portions of the respective gussets.

7. A combination as set forth in claim 6, wherein each gusset comprises several layers of heat-sealable material and further comprising heat-sealing means including a pair of heated jaws reciprocable toward and away from the end faces of said drum between intermittent rotations of the drum, each of said jaws being arranged to bond the layers of a gusset on each consecutive container while such gusset abuts against one end of the respective partition.

8. In an apparatus for manipulating filled heat-sealable parallelepiped containers of the type having an end wall, two triangular gussets extending laterally beyond the opposite ends of said end wall, and a flap extending transversely across and outwardly beyond said end wall and said gussets, in combination, a conveyor including a rotary drum having a plurality of equidistant recesses each extending radially inwardly from the periphery and all the way from the one to the other axial end thereof, each recess being located diametrically opposite another recess and each being arranged to accommodate a container in such a way that the flap extends beyond the periphery and that the gussets extend beyond the axial ends of said drum; drive means for intermittently rotating said drum through distances which equal the angular distance between said recesses and in such a way that one recess extends vertically upwardly and one recess extends vertically downwardly during each interval between consecutive rotations of said drum; means for feeding a filled container into that recess which extends upwardly between consecutive rotations of said drum; means for receiving containers by gravity feed from the recesses which extend downwardly between consecutive rotations of said drum; first folding means adjacent to the periphery of said drum and arranged to fold the flaps of consecutive containers against the respective end walls during intermittent rotations of said drum; second folding means adjacent to said drum and arranged to fold the gussets against the thus folded flaps and against the end walls of consecutive containers during intermittent rotations of said drum; and heat-sealing means for bonding the thus folded gussets of consecutive containers to the respective flaps and end walls between intermittent rotations of said drum.

9. A combination as set forth in claim 8, wherein each gusset comprises several layers of heat-sealable material and wherein said second folding means comprises a first pair of folding members arranged to fold the gussets of consecutive containers into planes which are perpendicular to the axis of said drum and a second pair of folding members arranged to thereupon fold the gussets of consecutive containers into abutment with the respective end walls.

10. A combination as set forth in claim 9, further comprising second heat-sealing means arranged to bond the layers of gussets on consecutive containers to each other subsequent to folding of gussets into said planes and prior to folding of gussets against the respective end walls.

11. In an apparatus for manipulating filled heat-sealable parallelepiped containers of the type having an end wall, two triangular gussets extending laterally beyond the opposite ends of said end wall, and a flap extending transversely across and outwardly beyond said end wall and said gussets, in combination, a conveyor including a rotary drum having a plurality of equidistant recesses each extending radially inwardly from the periphery and all the way from the one to the other axial end thereof, each of said recesses being arranged to accommodate a container in such a way that the flap extends beyond the periphery and that the gussets extend beyond the axial ends of said drum; drive means for intermittently rotating said drum through distances which equal the angular distance between said recesses; first folding means adjacent to the periphery of said drum and arranged to fold the flaps of consecutive containers against the respective end walls during intermittent rotations of said drum; second folding means adjacent to said drum and arranged to fold the gussets against the thus folded flaps and against the end walls of consecutive containers during intermittent rotations of said drum; heat-sealing means for bonding the thus folded gussets of consecutive containers to the respective flaps and end wall between intermittent rotations of said drum; and stacking means arranged to receive consecutive containers from said conveyor by gravity feed at a point past said heat-sealing means and in such a way that the end wall of each container is located at the lower end thereof, said stacking means comprising a table including a pair of panels movable toward and away from each other, transfer means for moving consecutive containers onto said table so that the table may support a row of containers, and means for conveying empty receptacles to a position beneath said table whereby, upon movement of said panels away from each other, a row of containers may descend into an empty receptable therebelow.

12. A combination as set forth in claim 11, further comprising a plurality of gripper means arranged to engage and to simultaneously transfer a row of containers from said table into an empty receptacle.

13. A combination as set forth in claim 12, wherein each container which descends from said conveyor comprises a second end wall at the upper end thereof and a second flap which is folded over said second end wall, each of said gripper means comprising a pair of relatively movable arms one of which is arranged to extend between the second end wall and the second flap of a container on said table and the other of which is arranged to engage the second flap opposite said first arm so that the second flaps are clamped between such arms, and a carriage supportingly connected with said grippers and arranged to reciprocate vertically upon movement of said panels way from each other so that a row of containers which are clamped by said gripper means may be transferred into an empty receptacle.

14. In an apparatus for handling filled heat-sealable parallelepiped containers for the type having first and second end walls, first and second pairs of triangular gussets respectively extending laterally beyond the opposite ends of such first and second end walls, and first and second flaps respectively extending transversely across and beyond said first and second end walls and the respective pairs of gussets, in combination, a drum arranged to rotate about a horizontal axis and having a plurality of equidistant recesses each extending radially inwardly from the periphery and axially from the one to the other axial end of said drum, each recess being arranged to accommodate a container in such a way that one flap extends beyond the periphery of said drum and that the major part of the other flap is accommodated in the interior of the respective recess with the ends of the flaps and with the gussets extending beyond the axial ends of said drum; drive means for intermittently rotating said drum through distances which equal the angular distance between consecutive recesses; a machine for feeding freshly filled containers into consecutive recesses in such a way that the first flap extends beyond the periphery of said drum; folding means comprising folding members arranged to fold the first flaps and the first pairs of gussets against the first end walls of consecutive containers during intermittent rotations of said drum; heat-sealing means located past said folding means and arranged to bond the thus folded first pairs of gussets to the first flaps and to the first end walls of consecutive containers between intermittent rotations of said drum; additional folding means for flexing the second pairs of gussets on consecutive containers against the end faces of said drum; and clipping means for severing portions of the thus folded second pairs of gussets so that the remainder of each gusset of each second pair forms a substantially trapeziform handle.

15. A combination as set forth in claim 14, wherein each gusset of each second pair comprises several layers of heat-sealable material, and further comprising additional heat-sealing means for bonding the layers in the remainder of each second pair of gussets.

References Cited

UNITED STATES PATENTS

| | | | |
|---|---|---|---|
| 2,196,666 | 4/1940 | Moore | 93—12 X |
| 3,055,490 | 9/1962 | Anderson | 53—234 X |
| 3,089,298 | 5/1963 | Neuendorf et al. | 53—373 X |

TRAVIS S. McGEHEE, *Primary Examiner.*

U.S. Cl. X.R.

53—234, 250